Patented June 17, 1924.

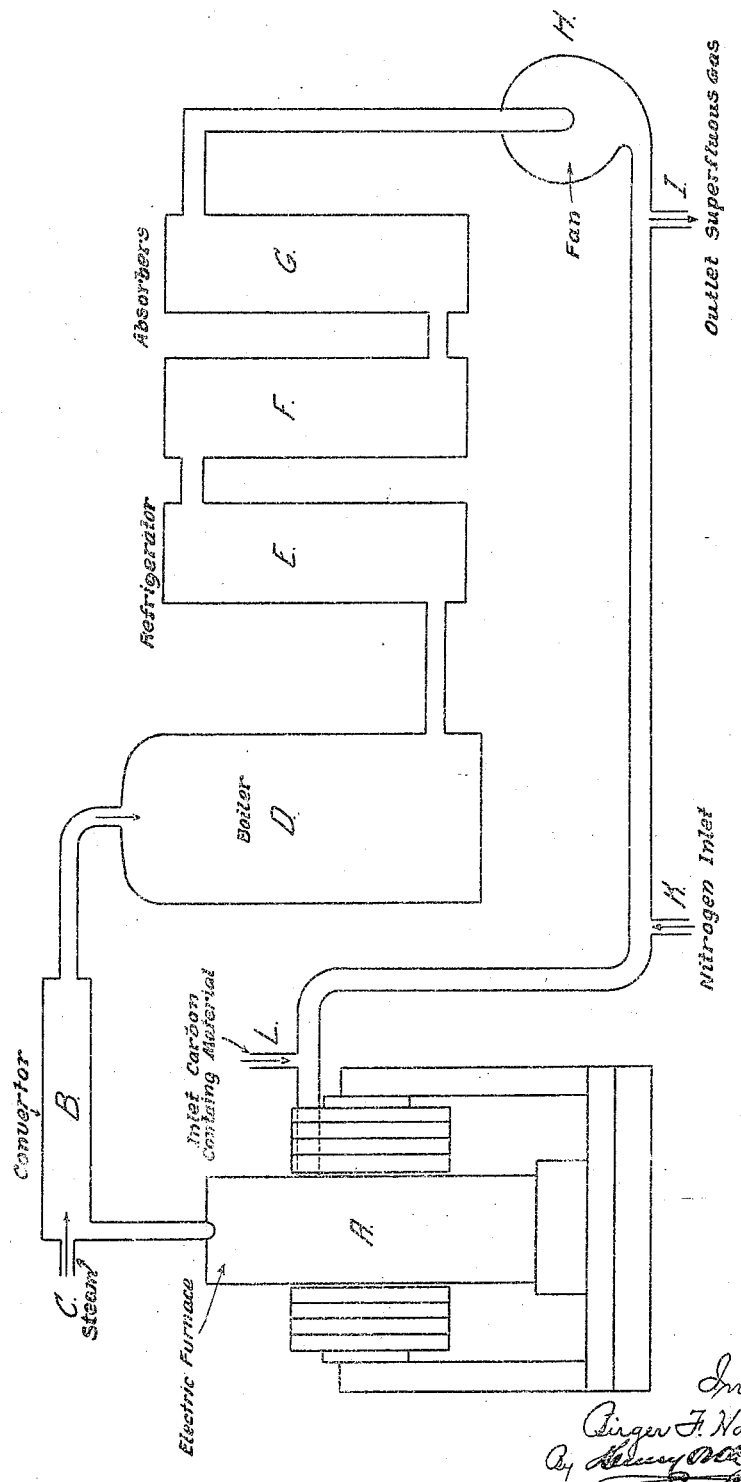

1,498,031

UNITED STATES PATENT OFFICE.

BIRGER FJELD HALVORSEN, OF CHRISTIANIA, NORWAY, ASSIGNOR TO NORSK HYDRO-ELEKTRISK KVAELSTOFAKTIESELSKAB, OF CHRISTIANIA, NORWAY.

PROCESS FOR THE PRODUCTION OF AMMONIA.

Application filed March 30, 1923. Serial No. 628,767.

*To all whom it may concern:*

Be it known that I, BIRGER FJELD HALVORSEN, a subject of the King of Norway, residing at Christiania, Norway, have invented certain new and useful Improvements in Processes for the Production of Ammonia; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object a process for the production of ammonia.

Ammonia, as it is known, is now produced either by the destructive distillation of coal or other organic matter, by the saponification of calcium-cyanamide, or synthetically from hydrogen and nitrogen. Other methods that are of practical importance are not employed as the well-known reaction between cyanide of hydrogen and steam, which under certain conditions leads to the formation of ammonia as shown by the following equation:

$$HCN + H_2O = NH_3 + CO$$

has apparently not been realized on a commercial scale.

The present invention deals with a process for the production of ammonia in an electric furnace which can be effected on a commercially economical scale, in which the decomposing influence which carbonic oxide has on steam is employed by using this reaction in a circular process for obtaining hydrogen which is required by the process for the production of cyanide of hydrogen. The only material thus required for the process is nitrogen, a carbonaceous material and steam, and the reactions of the process can be illustrated by the following 3 equations:

$$N_2 + H_2 + 2C = 2HCN \quad (1)$$
$$2HCN + 2H_2O = 2NH_3 + 2CO \quad (2)$$
$$2CO + 2H_2O = 2CO_2 + 2H_2 \quad (3)$$

As it appears from these equations twice as much hydrogen is obtained by equation 3 as that which is consumed in equation 1 and the gas therefore becomes steadily richer in hydrogen. On now taking the necessary amount of the hydrogenous gas and, after adding nitrogen and carbonaceous substance, returning it to the furnace, there will be a certain amount of hydrogen left which can be used for other purposes, for instance, for production of the nitrogen necessary to the process.

If carbon in the form of hydrocarbon compounds is used, hydrogen will thus be introduced into the process. The carbonaceous substance, instead of being mixed with the gases, can be directly added in the furnace, either in a solid or liquid condition, or as gas. The following may be mentioned as samples of such carbonaceous materials: pulverized coal, pitch, tar, illuminating gas, &c.

A cyclic process effected in this manner has not only the advantage that the raw material required for the production, which is most important taken from an economical point of view, is formed during the process itself, but it also has the technical advantage that the carbon monoxide, which is formed during the production of ammonia, is converted into carbon dioxide, which is far easier to remove from the gas mixture than carbon monoxide.

The reaction according to equation 1 requires a very high temperature and is therefore effected in an electric arc furnace of some serviceable type or other. The saponification process (equation 2) can take place at 1000°–1200° C., or, if a catalyzer is employed, at a still lower temperature (700–800° C.). As the reaction according to equation 3 requires a correspondingly low degree of temperature, both these reactions (either wholly or partly) can be effected in a single operation, so that ammonia, carbon di-oxide and hydrogen are directly obtained.

An example of how the process may be performed is given in the following, and attention is called to the drawing, which illustrates a suitable apparatus.

"A" represents an electric furnace into which a mixture of gas, consisting of nitrogen and hydrogen, and a carbonaceous substance, for instance, tar, is introduced. The reaction gases which leave the furnace at a temperature of about 1200° C. are conducted into a converting apparatus, B, into which steam is simultaneously blown through a tube C, and where the conversion of the hydrocyanic acid into ammonia and carbon monoxide is effected. The gases are then conducted through a boiler D, where they emit most of their heat. When the temperature of the gases has fallen below 1000° C. the converting of the carbon monoxide and steam commences, in that carbonic acid and hydrogen are formed. The gases which leave the boiler at a temperature of about 300° C. can be conducted into a catalyzer space, where the conversion into carbonic acid and hydrogen is completed. It then passes through a refrigerator, E, and finally the absorption apparatus F and G, where ammonia and carbonic acid is removed. These apparatus can also be percolated with acid, so that a salt of ammonium is obtained, for instance, nitrate of ammonium or sulphate of ammonium. In this case it is necessary to remove the carbonic acid in a separate absorption apparatus. The gases are sucked out of the absorption system by the ventilator, H, which forces most of the gases back into the furnace. The superfluous gas is taken out at I and can be used as mentioned above for production of the nitrogen necessary to the process. This gas can be added at K, while the carbonic material necessary to the process is either added before furnace A at L, or is conducted straight into the furnace. If the reactions according to equations 2 and 3 are to take place wholly as a single process, the gases from furnace A must be cooled to a suitable temperature before they enter converting apparatus B, in which they, in this case, are exposed to the influence of steam in the presence of a catalyzer.

The processes described above can to advantage be carried out under pressure whereby the output is increased and the reactions are more complete.

Claims:

1. The process of producing ammonia which comprises re-acting upon carbonaceous materials in an electric arc furnace with gases containing nitrogen and hydrogen to produce hydrocyanic acid as an intermediary product, re-acting upon the hydrocyanic acid with steam, removing ammonia and carbon dioxide from the resulting gas, enriching a substantial proportion of the same with nitrogen and carbon and returning the resulting gas mixture to the electric furnace.

2. A cyclic process for producing ammonia, which comprises passing a mixture of gases containing hydrogen, nitrogen and carbon through an electric arc furnace, adding steam to resulting gases, thereby forming ammonia and hydrogen, and returning gas containing hydrogen, nitrogen and carbon to the furnace.

3. A process for producing ammonia, which comprises passing a mixture of gases containing hydrogen, nitrogen and carbon through an electric arc furnace, treating the resultant gases with steam in the presence of a catalyzer, removing ammonia and carbon dioxide, and returning gas containing hydrogen and nitrogen in uncombined form and carbon in combined form to the furnace.

4. The process of producing ammonia which comprises re-acting upon carbonaceous materials in an electric arc furnace with gases containing nitrogen and hydrogen in uncombined form to produce hydrocyanic acid as an intermediary product, re-acting upon the hydrocyanic acid with steam, removing ammonia and carbon dioxide from the resulting gas, enriching a substantial proportion of the same with nitrogen and carbon, and returning the resulting gas mixture to the electric furnace.

In testimony that I claim the foregoing as my invention, I have signed my name in presence of two subscribing witnesses.

BIRGER FJELD HALVORSEN.

Witnesses:
MARIE BERGQUIST,
FRIGOLF HARALDEN.